United States Patent [19]

Fernandez

[11] 4,121,639
[45] Oct. 24, 1978

[54] CUSHION TIRE AND WHEEL CONSTRUCTION

[76] Inventor: Avelino Fernandez, 211 Collins Ave., Miami Beach, Fla. 33139

[21] Appl. No.: 824,402

[22] Filed: Aug. 15, 1977

Related U.S. Application Data

[63] Continuation of Ser. No. 668,691, Mar. 19, 1976, abandoned.

[51] Int. Cl.² .............................................. B60C 7/00
[52] U.S. Cl. ..................................... 152/329; 152/403
[58] Field of Search ............... 152/329, 328, 327, 325, 152/324, 339, 340, 341, 342, 403, 404, 158

[56] References Cited

U.S. PATENT DOCUMENTS

| | | | |
|---|---|---|---|
| 768,684 | 8/1904 | Parmley | 152/342 |
| 1,120,552 | 12/1914 | Sherman et al. | 152/329 X |
| 1,397,795 | 11/1921 | Clifford-Earp | 152/329 X |
| 1,814,623 | 7/1931 | Finnell | 152/403 |
| 3,827,792 | 8/1974 | Hollins | 152/403 X |

*Primary Examiner*—Allen N. Knowles
*Assistant Examiner*—Francis J. Bartuska

[57] ABSTRACT

A tire and wheel construction for vehicles such as automobiles, trucks, farm equipment, etc., which includes a wheel comprised of inner and outer disc portions, bolted together in their central portions, a rim portion formed in two annular, opposed half sections from the respective disc portions, and an outwardly turned flange from the outer periphery of each rim half section. The tire comprises an inner annular wall, including opposed, annular edge projections, configured for clamped engagement between the rim flanges, an outer annular tread wall and opposed side walls, integrally connecting between the inner and tread walls to define a completely enclosed annular chamber. Interiorly of the chamber is an annular outwardly extending projection, formed integral with the tread wall, and an inwardly extending annular projection, formed integral with the tread wall, the annular projections being cooperatingly configured, and aligned in a vertical annular path so as to become interengaged under the weight of a vehicle and to support a proportionate share of said weight without the necessity of being inflated with compressed air.

2 Claims, 3 Drawing Figures

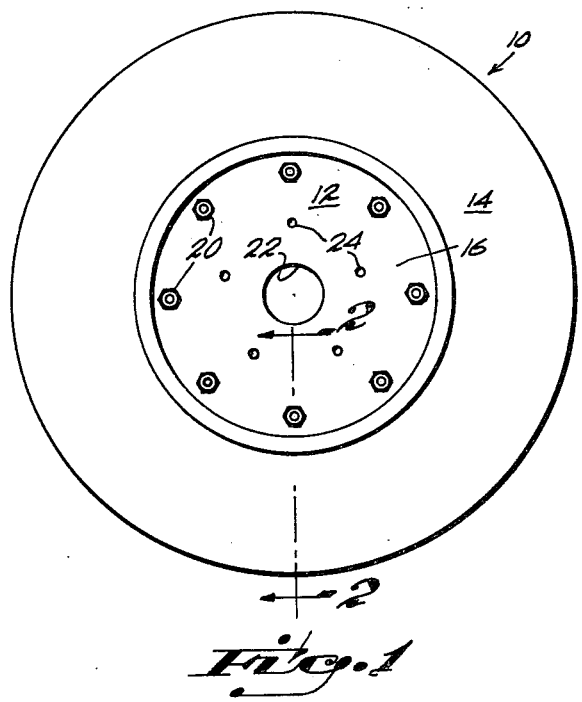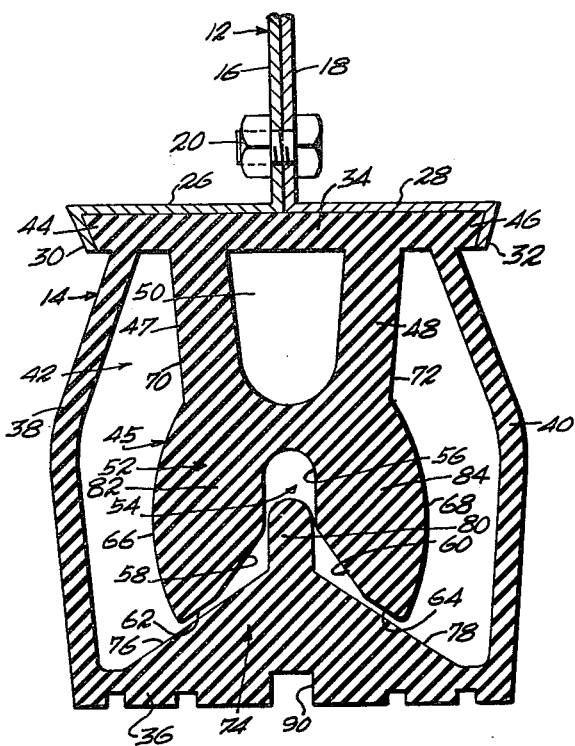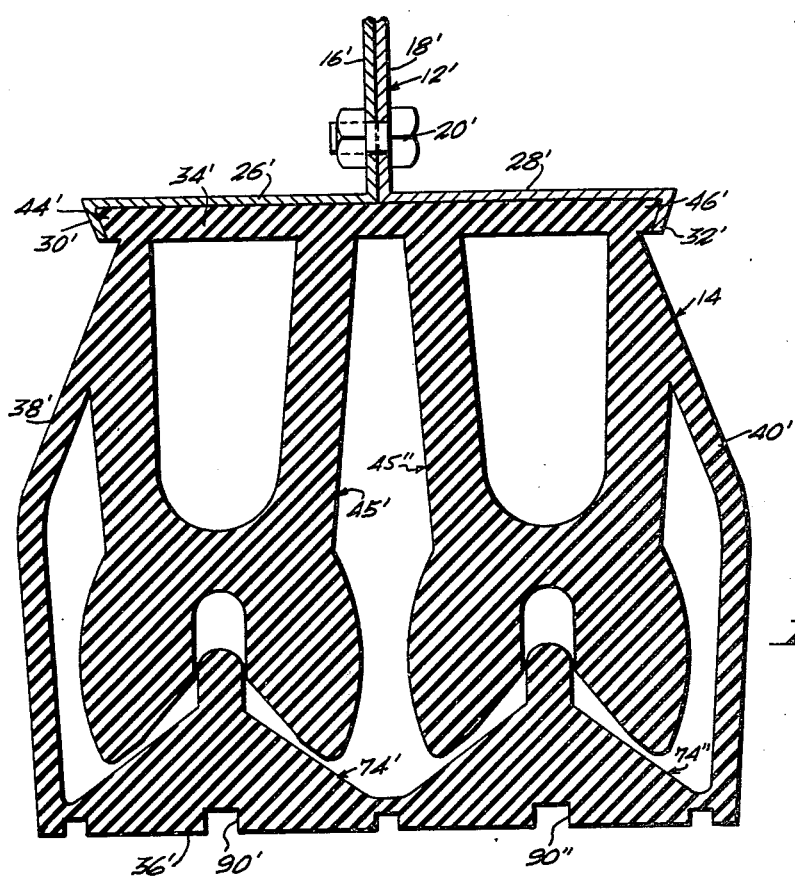

CUSHION TIRE AND WHEEL CONSTRUCTION

This is a continuation of application Ser. No. 668,691 filed Mar. 19, 1976, and now abandoned.

SUMMARY OF THE PRESENT INVENTION

The present invention pertains to a vehicle tire and wheel construction, the wheel being constructed of two bolted together half sections including opposed rim portions provided with means to securely clamp the tire thereto. The tire includes inner, outer and opposed side walls integrally formed to define an inner annular chamber. Interiorly of the chamber is at least one annularly, outwardly extending projection from the inner wall and at least one annularly, inwardly extending projection from the outer or tread wall to interengage in a manner so as to support a proportionate share of the weight of a vehicle without the necessity of inflating the tire with compressed air.

Therefore, one of the principal objects of the present invention is to provide a wheel and tire construction for a vehicle which provides a maximum degree of protection, for the vehicle passengers and the vehicle itself, from tire failure.

Another object of the instant invention is to provide interengaging clamp means on the wheel rim and the tire to preclude the possibility of the tire coming off of the wheel rim.

A further object of this invention is to provide a tire structure which supports its proportionate share of the weight of a vehicle without the need of inflation with compressed air.

BRIEF DESCRIPTION OF THE DRAWINGS

FIG. 1 is a side elevational view of the vehicle tire and wheel construction of the present invention;

FIG. 2 is a vertical, cross sectional view taken along line 2—2 of FIG. 1; and

FIG. 3 is a cross sectional view, similar to FIG. 2, of a modified form of the invention.

DETAILED DESCRIPTION OF THE DRAWINGS

With reference to the drawings in which like reference characters designate like or corresponding parts throughout the several views, and with particular reference to FIG. 1, the vehicle tire and wheel assembly of the present invention, indicated generally at 10, is comprised generally of a wheel 12 and a tire 14, mounted thereon.

The wheel 12 includes a pair of companionate disc portions 16 and 18, fixed together in a face-to-face relation by a plurality of nut and bolt attachments 20 in a spaced apart relation about the outer peripheral portion thereof. A conventional central opening 22 for the axle hub and a plurality of conventional lug holes 24 are provided through the disc portions 16 and 18.

Referring to FIG. 2, a pair of oppositely, outwardly extending wheel rim portions 26 and 28 extend outwardly from the outer peripheries of the respective disc portions 16 and 18. Oppositely, inwardly angled annular flange portions 30 and 32 are provided about the respective outer edges of the rim portions 26 and 28.

With reference to FIG. 2, the tire 14 includes an annular inner wall 34, an annular outer tread wall 36 and opposed side walls 38 and 40, integrally connecting between inner wall 34 and tread wall 36, defining an inner annular chamber 42. A pair of opposed, laterally extending side ribs 44 and 46 from inner wall 34 are companionately angled relative to annular flange portions 30 and 32 and are engaged therein whereby the tire 14 is firmly clamped in place relative to the rim portions 26 and 28 when the disc portions 16 and 18 are bolted together as above described.

Interiorly of the chamber 42, an outwardly, radially extending annular projection or rib 45 is formed integral with the inner wall 34. As illustrated in FIG. 2, the rib 45 includes a pair of spaced apart inwardly diverging annular leg portions 47 and 48 defining a secondary annular chamber 50 therebetween. Annular legs 47 and 48 comprise the integral connections to inner wall 34 and at their outer ends said legs 47 and 48 merge with an enlarged annular head portion 52 provided with a generally Y shaped annular groove 54 in its outer periphery. Groove 54 includes a central groove portion 56 with parallel walls connecting with a pair of outwardly diverging walls 58 and 60 which terminate in respective more sharply angled outer wall portions 62 and 64 connecting with respective arcuate outer walls 66 and 68, of head portion 52, which in turn join with outer walls 70 and 72 of legs 47 and 48.

A second annular rib 74, interiorly of chamber 42, is formed integral with the outer tread wall 36 in an opposed relation to rib 44. Rib 74 is also generally Y shaped in cross section, providing a pair of inwardly converging walls 76 and 78, companionately angled relative to wall portions 62 and 64 of rib 45, and a central inwardly extending annular leg 80, sized to be freely received in groove 56.

In operation, under a proportionate share of the weight of a vehicle, the walls 76 and 78 of rib 74 of tire 14 will first contact wall portions 62 and 64 forming a firm but resilient support for said weight through the tread wall 36, outer and inner annular ribs 74 and 45 and inner annular wall 34 to the wheel 16 through rim portions 26 and 28. Under increased weight forces such as occurs when a vehicle strikes a bump, the opposed side portions 82 and 84 of the enlarged annular head portion 52 will be flexed laterally, outwardly in opposed directions until the inwardly converging walls 76 and 78 of rib 74 engage the outwardly diverging wall portions 58 and 60 of inner rib 44. It will be understood that the rubber material from which the tire 14 is formed may be interiorly reinforced by a plurality of plies of appropriate materials in a conventional manner.

FIG. 3 illustrates a modified form of the present invention. With the exception of the provision of two pairs of aligned, inner and outer cooperating ribs 45' and 74', and 45" and 74", the details of the construction and functions thereof are identical with the form of FIGS. 1 and 2 and needs no further description. Where necessary, like reference characters are applied to FIG. 3 with prime and double prime designations.

It should be noted, in the tread design, an extra large groove such as 90, 90' and 90" are centrally aligned relative to the inner rib constructions to visually indicate whether the tire 14 is provided with a single or double pairs of interior ribs.

The vehicle tire and wheel construction of the present invention is self supporting containing no compressed air, and therefore, will afford a maximum degree of safety on any road surface. Flats and blowouts will not occur and any kind of puncture will have no effect on it when at rest or in motion.

What is claimed is:

1. A vehicle tire and wheel construction for use in combination comprising, a wheel including inner and outer disc portions and nut and bolt means connecting the portions in face-to-face relation, each disc having a rim portion formed about the periphery of said disc portions, a central hub opening and a plurality of spaced apart lug apertures in said disc portions and each of said disc portions having an outer edge of said rim portions and clamp means formed about said rim portions, a tire including an annular inner wall, an annular outer, tread wall and opposed side walls integrally connecting between said inner and outer walls, and defining an inner annular chamber;

a pair of opposed, laterally extending side ribs from said inner wall in mating clamped engagement in said clamp means;

a first annular rib within said chamber formed integral with said annular inner wall and extending radially outwardly therefrom toward said tread wall;

a second radially extending annular rib within said chamber, formed integral with said tread wall and extending inwardly therefrom to within a normally, relatively close proximity to said first annular rib;

said rim comprising two annular half sections extending outwardly in opposed directions from said outer edge portions of the respective disc portions;

said clamp means comprising a pair of opposed, inwardly angled flanges from respective outer annular edges of said two half sections;

said pair of side ribs each having an outer face complementarily angled to said flanges and in mating clamped engagement therewith;

said first annular rib including a pair of spaced apart downwardly diverging annular leg portions integral with said inner annular wall defining a secondary annular chamber therebetween, said annular leg portions merging at their outer ends to an enlarged outer, annular head portion;

said annular head portion having a peripheral, outwardly extending generally Y-shaped annular groove;

said Y-shaped groove including a central groove portion providing parallel side walls connecting with a pair of outwardly angled diverging walls which terminate in more sharply, outwardly angled outer wall portions connecting at their outer extremeties with respective arcuate outer side walls of said head portion;

said second radially extending annular rib is generally Y-shaped in cross section, providing a pair of inwardly converging walls, companionately angled to said more sharply, outwardly angled outer wall portions, and a central inwardly extending annular leg, sized for free reception in said central groove portion; and said wheel and tire construction including a pair of side-by-side first annular ribs and a pair of side-by-side second annular ribs in respective alignment with said pair of first annular ribs.

2. The wheel and tire construction as defined in claim 1 wherein said tread wall includes outer tread grooves including one distinctive annular groove in alignment with each of said aligned pairs of ribs.

* * * * *